(12) United States Patent
Nakano et al.

(10) Patent No.: US 12,287,033 B2
(45) Date of Patent: Apr. 29, 2025

(54) SEAL MEMBER

(71) Applicant: NIPPON PILLAR PACKING CO., LTD., Osaka (JP)

(72) Inventors: Atsushi Nakano, Osaka (JP); Go Nakai, Osaka (JP); Kazukiyo Teshima, Osaka (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 62 days.

(21) Appl. No.: 17/914,540

(22) PCT Filed: Jan. 14, 2021

(86) PCT No.: PCT/JP2021/001007
§ 371 (c)(1),
(2) Date: Sep. 26, 2022

(87) PCT Pub. No.: WO2021/199570
PCT Pub. Date: Oct. 7, 2021

(65) Prior Publication Data
US 2023/0148383 A1    May 11, 2023

(30) Foreign Application Priority Data
Mar. 30, 2020  (JP) ................. 2020-060435

(51) Int. Cl.
*F16J 15/10*    (2006.01)
*F16L 17/06*    (2006.01)

(52) U.S. Cl.
CPC ............ *F16J 15/104* (2013.01); *F16L 17/06* (2013.01)

(58) Field of Classification Search
CPC ....... F16L 17/067; F16L 17/063; F16L 17/06; F16J 15/104
See application file for complete search history.

(56) References Cited

U.S. PATENT DOCUMENTS 3,045,857 A * 7/1962 Lineweber ............ F16L 23/06
285/365
3,342,501 A * 9/1967 Meyer ............ B29C 45/14344
277/639

(Continued)

FOREIGN PATENT DOCUMENTS

JP    2018168947 A    11/2018
JP    2019173844 A  * 10/2019  ............ F16J 15/022

(Continued)

OTHER PUBLICATIONS

International Search report PCT/JP2021/001007 dated Feb. 9, 2021 (pp. 1-4).

*Primary Examiner* — Eugene G Byrd
(74) *Attorney, Agent, or Firm* — Millen, White, Zelano & Branigan P.C.; William F. Nixon

(57) ABSTRACT

A gasket 4 includes: a cylindrical body portion 10 having a communication hole 10a for providing communication between flow passage holes 2c, 2c formed in two fluid devices 2, 2, respectively; and an annular primary sealing portion 11 projecting from a radially inner side of an axially outer end portion of the body portion 10 toward an axially outer side and to be press-fitted into an annular primary sealing groove 2d formed in each fluid device 2. In a state before the primary sealing portion 11 is press-fitted into the primary sealing groove 2d, an entirety of an inner circumferential surface 10b of the body portion 10 is formed such that a diameter thereof gradually decreases from both axially outer ends thereof toward an axially inner side.

4 Claims, 8 Drawing Sheets

(56) References Cited

U.S. PATENT DOCUMENTS

| | | | | |
|---|---|---|---|---|
| 3,720,420 | A | * | 3/1973 | Jelinek ............... F16J 15/104 |
| | | | | 277/611 |
| 5,257,834 | A | * | 11/1993 | Zeidler ............... F16L 23/04 |
| | | | | 285/910 |
| 11,073,209 | B2 | * | 7/2021 | Takeda ............... F16J 15/3432 |
| D997,310 | S | * | 8/2023 | Nakano ............... D23/269 |
| 2006/0220326 | A1 | * | 10/2006 | Leadley-Brown ..... F16J 15/062 |
| | | | | 277/609 |
| 2007/0013146 | A1 | * | 1/2007 | Gariepy ............... F16L 17/06 |
| | | | | 277/608 |
| 2019/0331272 | A1 | | 10/2019 | Fujii et al. |
| 2019/0368611 | A1 | * | 12/2019 | Nakano ............... F16J 15/104 |
| 2019/0390773 | A1 | * | 12/2019 | Adachi ............... F16J 15/025 |
| 2020/0408305 | A1 | | 12/2020 | Adachi et al. |
| 2021/0088141 | A1 | * | 3/2021 | Nakano ............... F16L 17/067 |

FOREIGN PATENT DOCUMENTS

| | | | | |
|---|---|---|---|---|
| JP | 2021156428 | A | * 10/2021 | ............ F16J 15/104 |
| WO | WO-2019163690 | A1 | * 8/2019 | ............ F16J 15/061 |
| WO | WO-2022059267 | A1 | * 3/2022 | ............ F16J 15/062 |

* cited by examiner (AXIAL DIRECTION) (AXIAL DIRECTION)
OUTER SIDE ←——————→ INNER SIDE ←——————→ OUTER SIDE

SEAL MEMBER

TECHNICAL FIELD

The present invention relates to a sealing member.

BACKGROUND ART

In manufacturing processes in various technical fields such as semiconductor manufacturing, medical/pharmaceutical manufacturing, and food processing/chemical industries, in a pipe path through which fluids such as chemical solutions, high-purity liquids, ultrapure water, or cleaning solutions flow, for example, a gasket for preventing fluid leakage is used as a connection structure that connects flow passage holes formed in two fluid devices (see, for example, PATENT LITERATURE 1).

FIG. 7 is an axial cross-sectional view of a conventional gasket. A conventional gasket 100 includes a cylindrical body portion 110, an annular primary sealing portion 111 formed on the radially inner side of each axially outer end portion of the body portion 110 so as to project toward the axially outer side, and an annular secondary sealing portion 112 formed on the radially outer side of each axially outer end portion of the body portion 110 so as to project toward the axially outer side.

FIG. 8 is an axial cross-sectional view showing a state where flow passage holes 153, 153 formed in two fluid devices 150, 150 are connected by the conventional gasket 100. The internal space of the body portion 110 is a communication hole 113 which provides communication between the flow passage holes 153, 153 of both fluid devices 150, 150. The primary sealing portion 111 and the secondary sealing portion 112 are respectively press-fitted into an annular primary sealing groove 151 and an annular secondary sealing groove 152 formed on each fluid device 150. Accordingly, sealing performance between each fluid device 150 and the gasket 100 is ensured to prevent a fluid from leaking to the outside.

CITATION LIST

Patent Literature

PATENT LITERATURE 1: Japanese Laid-Open Patent Publication No. 2019-173844

SUMMARY OF THE INVENTION

Technical Problem

As shown in FIG. 8, a cross-sectional shape of the primary sealing portion 111 is formed so as to be gradually tapered from the axially inner end thereof toward the axially outer end thereof. In addition, a cross-sectional shape of the primary sealing groove 151 is inclined along the tapered shape of the primary sealing portion 111. Therefore, when the primary sealing portion 111 is press-fitted into the primary sealing groove 151, the axially outer end of the primary sealing portion 111 may slip along the slope of the primary sealing groove 151 toward the axially outer side. When such a slip occurs, an inner circumferential surface 110a of the body portion 110 becomes bent and deformed so as to be recessed toward the radially outer side such that the inner circumferential side of the body portion 110 is bent. In this case, the contact surface pressure between the axially outer end of the primary sealing portion 111 and the primary sealing groove 151 may decrease, and the fluid may enter between the primary sealing portion 111 and the primary sealing groove 151 and stay therein or leak to the outside.

The present invention has been made in view of such circumstances, and an object of the present invention is to provide a sealing member that can suppress fluid leakage.

Solution to Problem (1) A sealing member of the present invention is a sealing member for sealing and connecting flow passage holes formed in two fluid devices, respectively, the sealing member including: a cylindrical body portion having a communication hole for providing communication between the flow passage holes; and an annular sealing portion projecting from a radially inner side of an axially outer end portion of the body portion toward an axially outer side and to be press-fitted into an annular sealing groove formed at a connection end portion of the flow passage hole of one of the fluid devices, wherein, in a pre-press-fit state which is a state before the sealing portion is press-fitted into the sealing groove, at least a part of an inner circumferential surface of the body portion and/or a part of another portion, excluding an axially outer end portion, of an inner circumferential surface of the sealing portion is formed such that a diameter thereof gradually decreases from the axially outer side toward an axially inner side.

According to the present invention, in the pre-press-fit state, at least a part of the inner circumferential surface of the body portion and/or a part of the other portion of the inner circumferential surface of the sealing portion is formed so as to project toward the radially inner side. Accordingly, when the sealing portion is press-fitted into the sealing groove, even if the axially outer end of the sealing portion slips relative to the sealing groove, the inner circumferential surface of the body portion can be inhibited from becoming bent and deformed so as to be recessed toward the radially outer side. As a result, the contact surface pressure between the axially outer end of the sealing portion and the sealing groove can be inhibited from decreasing, so that a fluid can be inhibited from entering between the sealing portion and the sealing groove and leaking to the outside.

(2) In the pre-press-fit state, at least a part of the inner circumferential surface of the body portion is preferably formed such that the diameter thereof gradually decreases from the axially outer side toward the axially inner side.

In this case, in the pre-press-fit state, at least a part of the inner circumferential surface of the body portion is formed so as to project toward the radially inner side. Accordingly, when the sealing portion is press-fitted into the sealing groove, the inner circumferential surface of the body portion can be further inhibited from becoming bent and deformed so as to be recessed toward the radially outer side.

(3) In the pre-press-fit state, an entirety of the inner circumferential surface of the body portion is preferably formed such that the diameter thereof gradually decreases from both axially outer ends thereof toward the axially inner side.

In this case, in the pre-press-fit state, the entirety of the inner circumferential surface of the body portion is formed so as to project toward the radially inner side. Accordingly, when the sealing portion is press-fitted into the sealing groove, the inner circumferential surface of the body portion can be further inhibited from becoming bent and deformed so as to be recessed toward the radially outer side.

(4) In the pre-press-fit state, the axially outer end portion of the inner circumferential surface of the sealing portion is preferably formed such that the diameter thereof gradually decreases from an axially outer end thereof toward an axially inner end thereof.

In this case, in the pre-press-fit state, the axially outer end portion of the inner circumferential surface of the sealing portion is located on the radially outer side with respect to the other portion of the inner circumferential surface. Accordingly, when the sealing portion is press-fitted into the sealing groove, even if the axially outer end of the sealing portion slips relative to the sealing groove, the axially outer end portion of the inner circumferential surface of the sealing portion can be inhibited from excessively projecting toward the radially inner side. Accordingly, the flow of the fluid in the communication hole of the body portion can be inhibited from being obstructed by the inner circumferential surface of the sealing portion.

(5) Preferably, in the pre-press-fit state, at least a part of the inner circumferential surface of the body portion is formed such that the diameter thereof gradually decreases from the axially outer side toward the axially inner side, and a degree of diameter decrease of the axially outer end portion of the inner circumferential surface of the sealing portion is larger than a degree of diameter decrease of the inner circumferential surface of the body portion.

In this case, since the degree of diameter decrease of the axially outer end portion of the inner circumferential surface of the sealing portion is larger than the degree of diameter decrease of the inner circumferential surface of the body portion, the radial thickness on the axially outer side of the sealing portion can be larger than in the case where the degree of diameter decrease of the sealing portion is the same as the degree of diameter decrease of the body portion. Accordingly, the contact surface pressure between the axially outer end of the sealing portion and the sealing groove can be further inhibited from decreasing.

(6) In the pre-press-fit state, an entirety of the inner circumferential surface of the sealing portion is preferably formed such that the diameter thereof gradually decreases from an axially outer end thereof toward an axially inner end thereof.

In this case, in the pre-press-fit state, the entirety of the inner circumferential surface of the sealing portion is formed so as to project toward the radially inner side. Accordingly, when the sealing portion is press-fitted into the sealing groove, the inner circumferential surface of the sealing portion can be further inhibited from becoming bent and deformed so as to be recessed toward the radially outer side together with the body portion, so that the contact surface pressure between the axially outer end of the sealing portion and the sealing groove can be further inhibited from decreasing.

(7) In the pre-press-fit state, the entirety of the inner circumferential surface of the body portion is preferably formed by a curved line projecting toward the radially inner side in an axial cross-sectional view.

In this case, in the pre-press-fit state, the entirety of the inner circumferential surface of the body portion is formed by the curved line projecting toward the radially inner side in an axial cross-sectional view. Accordingly, when the sealing portion is press-fitted into the sealing groove, the inner circumferential surface of the body portion can be further inhibited from becoming bent and deformed so as to be recessed toward the radially outer side.

(8) The entirety of the inner circumferential surface of the body portion is preferably formed so as not to become bent and deformed toward a radially outer side beyond a straight line extending in an axial direction in an axial cross-sectional view in a state where the sealing portion is press-fitted into the sealing groove.

In this case, in a state where the sealing portion is press-fitted into the sealing groove, the inner circumferential surface of the body portion can be inhibited from becoming bent and deformed toward the radially outer side beyond the straight line extending in the axial direction, so that the contact surface pressure between the axially outer end of the sealing portion and the sealing groove can be further inhibited from decreasing.

Advantageous Effects of the Invention

According to the present invention, it is possible to suppress fluid leakage.

DETAILED DESCRIPTION

First Embodiment

<Entire Configuration of Flow Passage Connection Structure>

Figure 1:
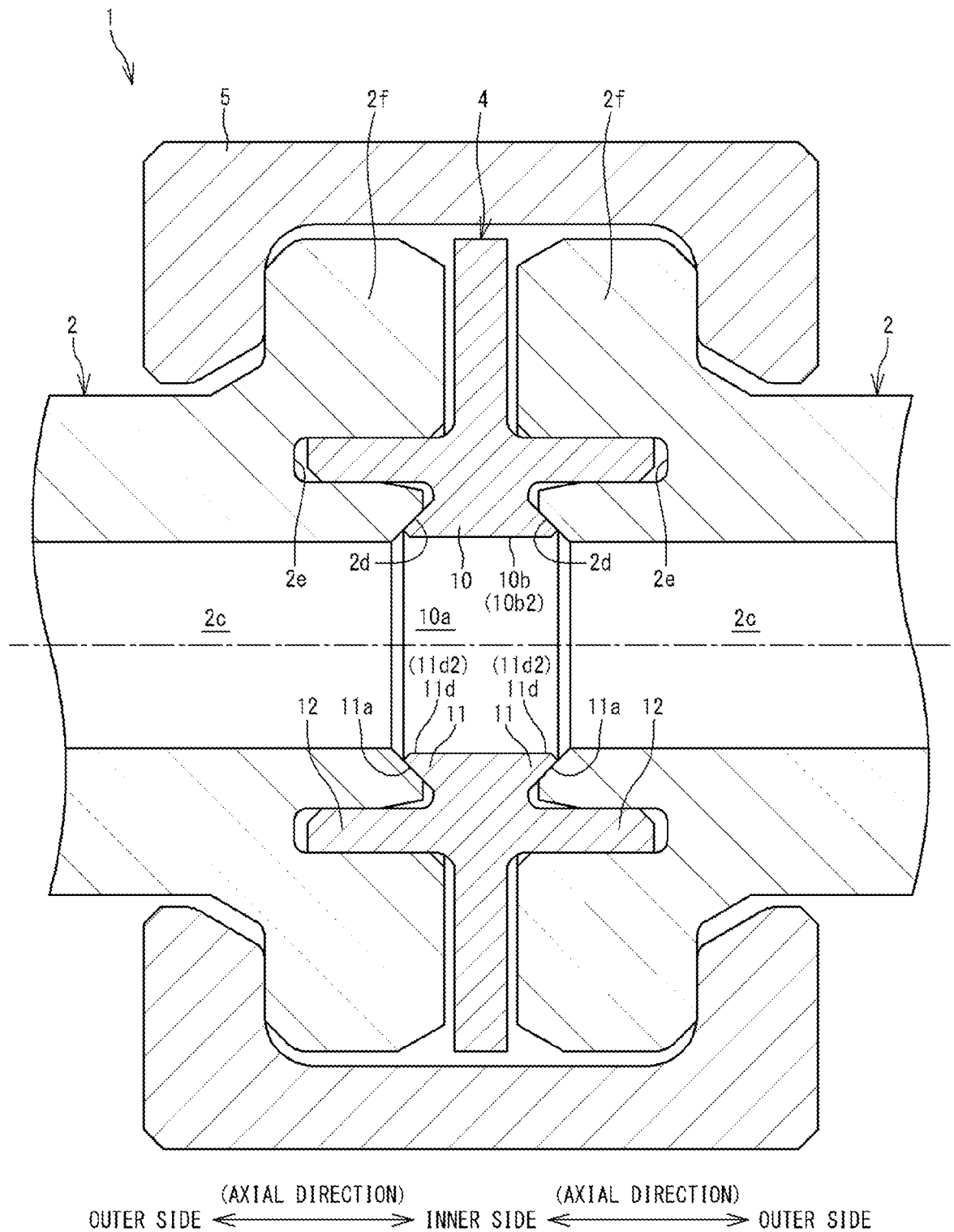
FIG. 1 is an axial cross-sectional view of a flow passage connection structure, in which a sealing member is used, according to a first embodiment of the present invention.

FIG. 1 is an axial cross-sectional view of a flow passage connection structure, in which a sealing member is used, according to a first embodiment of the present invention. A flow passage connection structure 1 shown in FIG. 1 is used, for example, as a connection structure that connects flow passage holes 2c, 2c formed in two adjacent fluid devices 2, 2, respectively, in a pipe path through which a chemical solution used in a semiconductor manufacturing apparatus flows. Examples of each fluid device 2 of the present embodiment include a pump, a valve, an accumulator, a filter, a flow meter, a pressure sensor, a pipe block, and an integrated module or integrated panel that unitizes these devices.

The flow passage connection structure 1 includes annular primary sealing grooves (sealing grooves) 2d and annular secondary sealing grooves 2e which are formed on end portions of the respective fluid devices 2, a gasket 4, and a clamp 5. The gasket 4 is a sealing member that seals and connects the flow passage holes 2c, 2c of the two fluid devices 2, 2. Hereinafter, in the present embodiment, the directions from the axial center toward both axial sides of the gasket 4 are referred to as an axially outer side, and the directions from both axial sides toward the axial center of the gasket 4 are referred to as an axially inner side.

The primary sealing groove 2d of each fluid device 2 is formed on the circumferential surface of a connection end portion of the flow passage hole 2c in a tapered shape that is cut such that the diameter thereof gradually increases from the axially outer end thereof toward the axially inner end thereof. The secondary sealing groove 2e of each fluid device 2 is located on the radially outer side with respect to the primary sealing groove 2d in each fluid device 2, and is formed in a cylindrical annular shape.

The gasket 4 is formed from a synthetic resin material such as polyvinyl chloride (PVC), polypropylene (PP), polyethylene (PE), or a fluorine resin (perfluoroalkoxy alkane (PFA), polytetrafluoroethylene (PTFE), polyvinylidene fluoride (PVDF), or the like). The gasket 4 includes a body portion 10 formed in a cylindrical shape, a pair of annular primary sealing portions (sealing portions) 11, and a pair of annular secondary sealing portions 12. A communication hole 10a which provides communication between the flow passage holes 2c, 2c of the two fluid devices 2, 2 is formed inside the body portion 10.

The pair of primary sealing portions 11 are formed so as to project from the radially inner sides of outer end portions on both axial sides of the body portion 10, respectively, toward the axially outer side. Each primary sealing portion 11 is formed so as to be tapered from the axially inner end thereof toward the axially outer end thereof in an axial cross-sectional view. An outer circumferential surface 11a of each primary sealing portion 11 is formed, so as to match the shape of the primary sealing groove 2d, as a tapered surface formed such that the diameter thereof gradually increases from the axially outer end thereof toward the axially inner end thereof. Accordingly, each primary sealing portion 11 is press-fitted into the primary sealing groove 2d of the corresponding fluid device 2.

The pair of secondary sealing portions 12 are formed so as to project from the radially outer sides of the outer end portions on both axial sides of the body portion 10, respectively, toward the axially outer side. Each secondary sealing portion 12 is formed in a cylindrical annular shape and press-fitted into the secondary sealing groove 2e of the corresponding fluid device 2.

With the above configuration, since the pair of primary sealing portions 11 and the pair of secondary sealing portions 12 of the gasket 4 are press-fitted into the primary sealing grooves 2d and the secondary sealing grooves 2e of the respective fluid devices 2, sealing performance at a connection portion between the flow passage holes 2c, 2c in the two fluid devices 2, 2 can be ensured.

The clamp 5 is formed in a substantially C-shaped cross-sectional shape, for example, and connects both fluid devices 2, 2 in a state where the flow passage holes 2c, 2c of both fluid devices 2, 2 are connected by the gasket 4. Specifically, the clamp 5 sandwiches and squeezes flange portions 2f, 2f, which are formed at end portions of the respective fluid devices 2, 2, in the axial direction. Accordingly, a sealed state where the gasket 4 is press-fitted into the primary sealing groove 2d and the secondary sealing groove 2e of each fluid device 2 can be maintained. The flow passage connection structure 1 may include other connection means such as a bolt and a nut, in addition to the clamp 5.

Meanwhile, when each primary sealing portion 11 and each secondary sealing portion 12 of the gasket 4 are press-fitted into the primary sealing groove 2d and the secondary sealing groove 2e of each fluid device 2, the axially outer end of the primary sealing portion 11 may slip along the slope of the primary sealing groove 2d toward the axially outer side. When such a slip occurs, an inner circumferential surface 10b of the body portion 10 becomes bent and deformed toward the radially outer side such that the inner circumferential side of the body portion 10 is bent. In the present embodiment, the inner circumferential surface 10b of the body portion 10 is formed in a shape that inhibits the inner circumferential surface 10b from becoming bent and deformed so as to be recessed toward the radially outer side in a press-fitted state which is a state where the primary sealing portions 11 and the secondary sealing portions 12 are press-fitted into the primary sealing grooves 2d and the secondary sealing grooves 2e. Hereinafter, the detailed shape thereof will be described.

<Shape of Inner Circumferential Side of Gasket>

Figure 2:
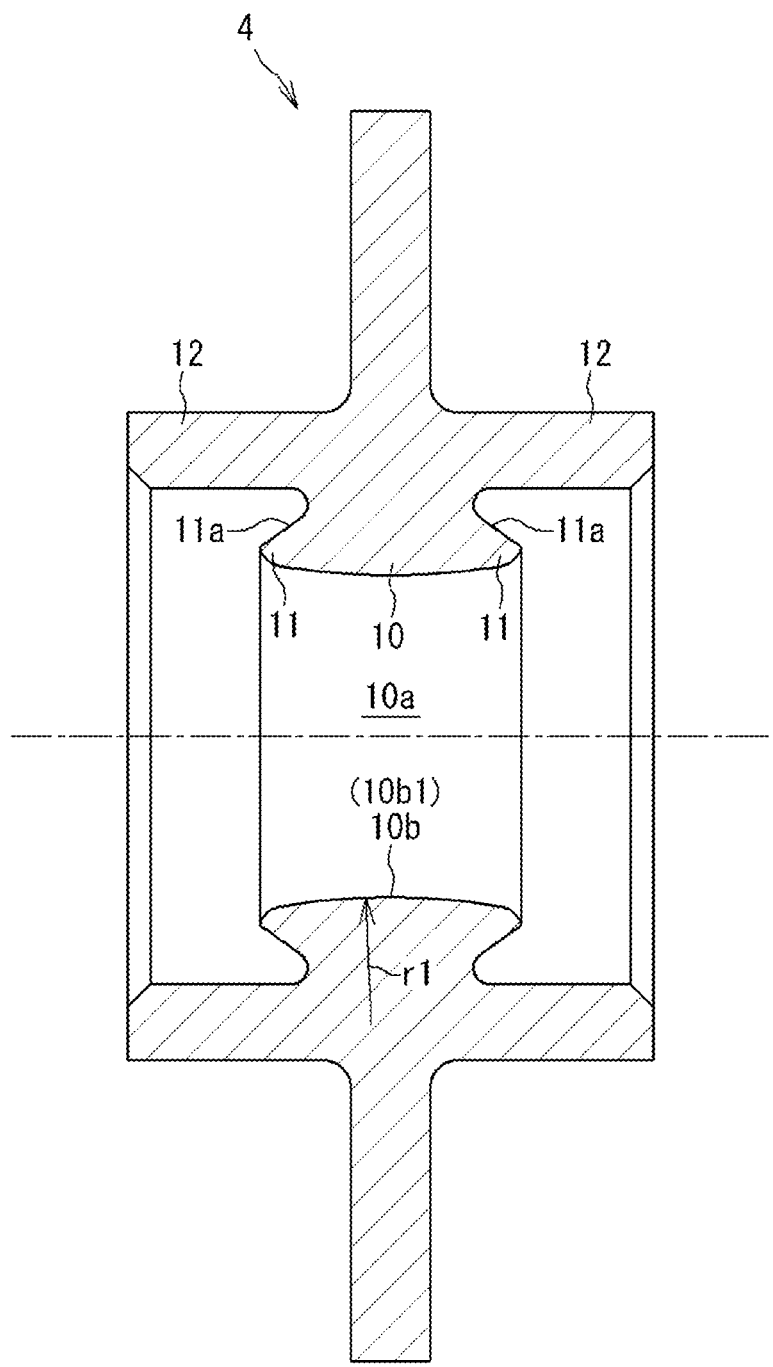
FIG. 2 is an axial cross-sectional view of a gasket.

FIG. 2 is an axial cross-sectional view of the gasket 4 and shows a pre-press-fit state which is a state before the primary sealing portions 11 and the secondary sealing portions 12 are press-fitted into the primary sealing grooves 2d and the secondary sealing grooves 2e (see FIG. 1). In FIG. 2, the entirety of the inner circumferential surface 10b of the body portion 10 of the gasket 4 is formed such that the diameter thereof gradually decreases from both axially outer ends thereof toward the axially inner side.

In the present embodiment, the entirety of the inner circumferential surface 10b of the body portion 10 is formed by a curved line 10b1 projecting most radially inward at a center in the axial direction thereof in an axial cross-sectional view. The curved line 10b1 of the inner circumferential surface 10b is formed such that, in the press-fitted state shown in FIG. 1, the curved line 10b1 becomes bent and deformed toward the radially outer side to be a straight line 10b2 extending in the axial direction. That is, a radius of curvature r1 of the curved line 10b1 is set such that the shape after the curved line 10b1 becomes bent and deformed toward the radially outer side becomes the straight line 10b2.

Figure 3:
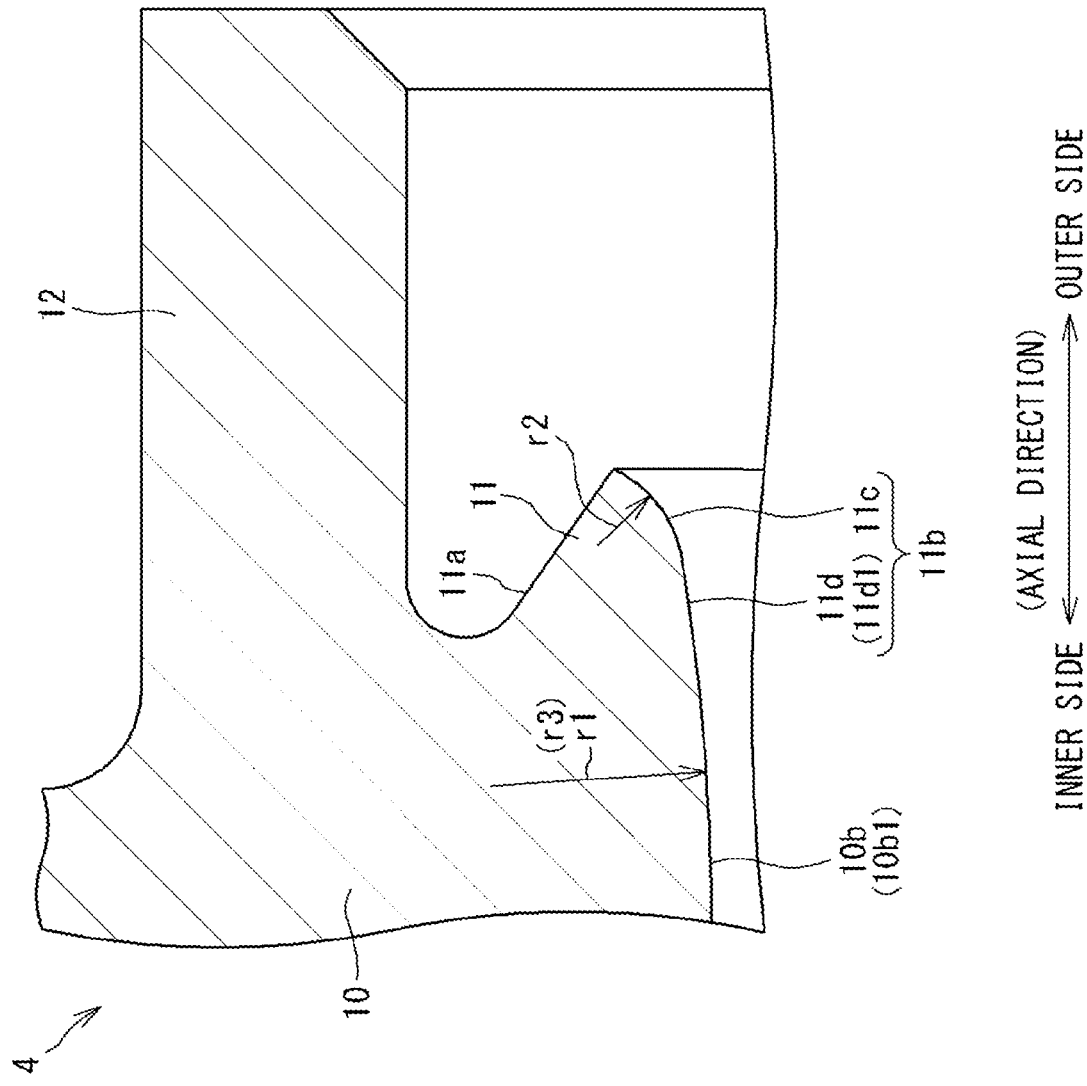
FIG. 3 is an enlarged cross-sectional view of a main part of FIG. 2.

FIG. 3 is an enlarged cross-sectional view of a main part of FIG. 2. In FIG. 3, the entirety of an inner circumferential surface 11b of the primary sealing portion 11 of the gasket 4 is formed such that the diameter thereof gradually decreases from the axially outer end thereof toward the axially inner end thereof. In the present embodiment, the entirety of the inner circumferential surface 11b of each primary sealing portion 11 is formed by a curved line projecting most radially inward at the axially inner end thereof in an axial cross-sectional view.

The degree of diameter decrease of an axially outer end portion 11c in the inner circumferential surface 11b of each primary sealing portion 11 is larger than the degree of diameter decrease of the inner circumferential surface 10b of the body portion 10. That is, a radius of curvature r2 of the axially outer end portion 11c in the inner circumferential surface 11b of each primary sealing portion 11 is smaller than the radius of curvature r1 of the inner circumferential surface 10b of the body portion 10.

The entirety of another portion 11d, excluding the axially outer end portion 11c, of the inner circumferential surface 11b of each primary sealing portion 11 is formed such that the diameter thereof gradually decreases from the axially outer end thereof toward the axially inner end thereof. In the present embodiment, the entirety of the other portion 11d is formed by a curved line 11d1 projecting most radially inward at the axially inner end thereof in an axial cross-sectional view. A radius of curvature r3 of the curved line 11d1 is equal to the radius of curvature r1 of the inner circumferential surface 10b of the body portion 10. Therefore, the curved line 11d1 is formed such that, in the press-fitted state shown in FIG. 1, the curved line 11d1 becomes bent and deformed toward the radially outer side to be a straight line 11d2 extending in the axial direction. That is, the radius of curvature r3 of the curved line 11d1 is set such that the shape after the curved line 11d1 becomes bent and deformed toward the radially outer side becomes the straight line 11d2.

Advantageous Effects of First Embodiment

In the gasket 4 of the present embodiment, in the pre-press-fit state, the entirety of the inner circumferential surface 10b of the body portion 10 is formed such that the diameter thereof gradually decreases from both axially outer ends thereof toward the axially inner side. That is, in the pre-press-fit state, the entirety of the inner circumferential surface 10b of the body portion 10 is formed so as to project toward the radially inner side. Accordingly, when each primary sealing portion 11 is press-fitted into the primary sealing groove 2d, even if the axially outer end of the primary sealing portion 11 slips along the slope of the primary sealing groove 2d toward the axially outer side, the inner circumferential surface 10b of the body portion 10 can be inhibited from becoming bent and deformed so as to be recessed toward the radially outer side. As a result, the contact surface pressure between the axially outer end of the primary sealing portion 11 and the primary sealing groove 2d can be inhibited from decreasing, so that a fluid can be inhibited from entering between the primary sealing portion 11 and the primary sealing groove 2d and leaking to the outside.

Moreover, in the pre-press-fit state, the entirety of the inner circumferential surface 11b of each primary sealing portion 11 is formed such that the diameter thereof gradually decreases from the axially outer end thereof toward the axially inner end thereof. That is, in the pre-press-fit state, the entirety of the inner circumferential surface 11b of each primary sealing portion 11 is formed so as to project toward the radially inner side. Accordingly, when each primary sealing portion 11 is press-fitted into the primary sealing groove 2d, the inner circumferential surface 11b of the primary sealing portion 11 can be further inhibited from becoming bent and deformed so as to be recessed toward the radially outer side together with the body portion 10. As a result, the contact surface pressure between the axially outer end of the primary sealing portion 11 and the primary sealing groove 2d can be further inhibited from decreasing.

Moreover, in the pre-press-fit state, the axially outer end portion 11c of the inner circumferential surface 11b of each primary sealing portion 11 is formed such that the diameter thereof gradually decreases from the axially outer end thereof toward the axially inner end thereof. That is, in the pre-press-fit state, the axially outer end portion 11c of the inner circumferential surface 11b of each primary sealing portion 11 is located on the radially outer side with respect to the other portion 11d of the inner circumferential surface 11b. Accordingly, when each primary sealing portion 11 is press-fitted into the primary sealing groove 2d, even if the axially outer end of the primary sealing portion 11 slips relative to the primary sealing groove 2d, the axially outer end portion 11c of the inner circumferential surface 11b of the primary sealing portion 11 can be inhibited from excessively projecting toward the radially inner side. Accordingly, the flow of the fluid in the communication hole 10a of the body portion 10 can be inhibited from being obstructed by the inner circumferential surface 11b of the primary sealing portion 11.

Moreover, since the degree of diameter decrease of the axially outer end portion 11c of the inner circumferential surface 11b of each primary sealing portion 11 is larger than the degree of diameter decrease of the inner circumferential surface 10b of the body portion 10, the radial thickness on the axially outer side of the primary sealing portion 11 can be larger than in the case where the degree of diameter decrease of the primary sealing portion 11 is the same as the degree of diameter decrease of the body portion 10. Accordingly, the contact surface pressure between the axially outer end of the primary sealing portion 11 and the primary sealing groove 2d can be further inhibited from decreasing.

Moreover, in the pre-press-fit state, the entirety of the inner circumferential surface 10b of the body portion 10 is formed by the curved line 10b1 projecting toward the radially inner side. Accordingly, when each primary sealing portion 11 is press-fitted into the primary sealing groove 2d, the inner circumferential surface 10b of the body portion 10 can be further inhibited from becoming bent and deformed so as to be recessed toward the radially outer side.

Moreover, the curved line 10b1 of the inner circumferential surface 10b of the body portion 10 and the curved line 11d1 of the other portion 11d of the inner circumferential surface 11b of each primary sealing portion 11 are formed such that, in the press-fitted state, the curved line 10b1 and the curved line 11d1 become bent and deformed toward the radially outer side to be the straight lines 10b2 and 11d2. Accordingly, the inner circumferential surface 10b of the body portion 10 can be further inhibited from becoming bent and deformed so as to be recessed toward the radially outer side in the press-fitted state. As a result, the contact surface pressure between the axially outer end of the primary sealing portion 11 and the primary sealing groove 2d can be further inhibited from decreasing.

Second Embodiment

<Entire Configuration of Flow Passage Connection Structure>

Figure 4:
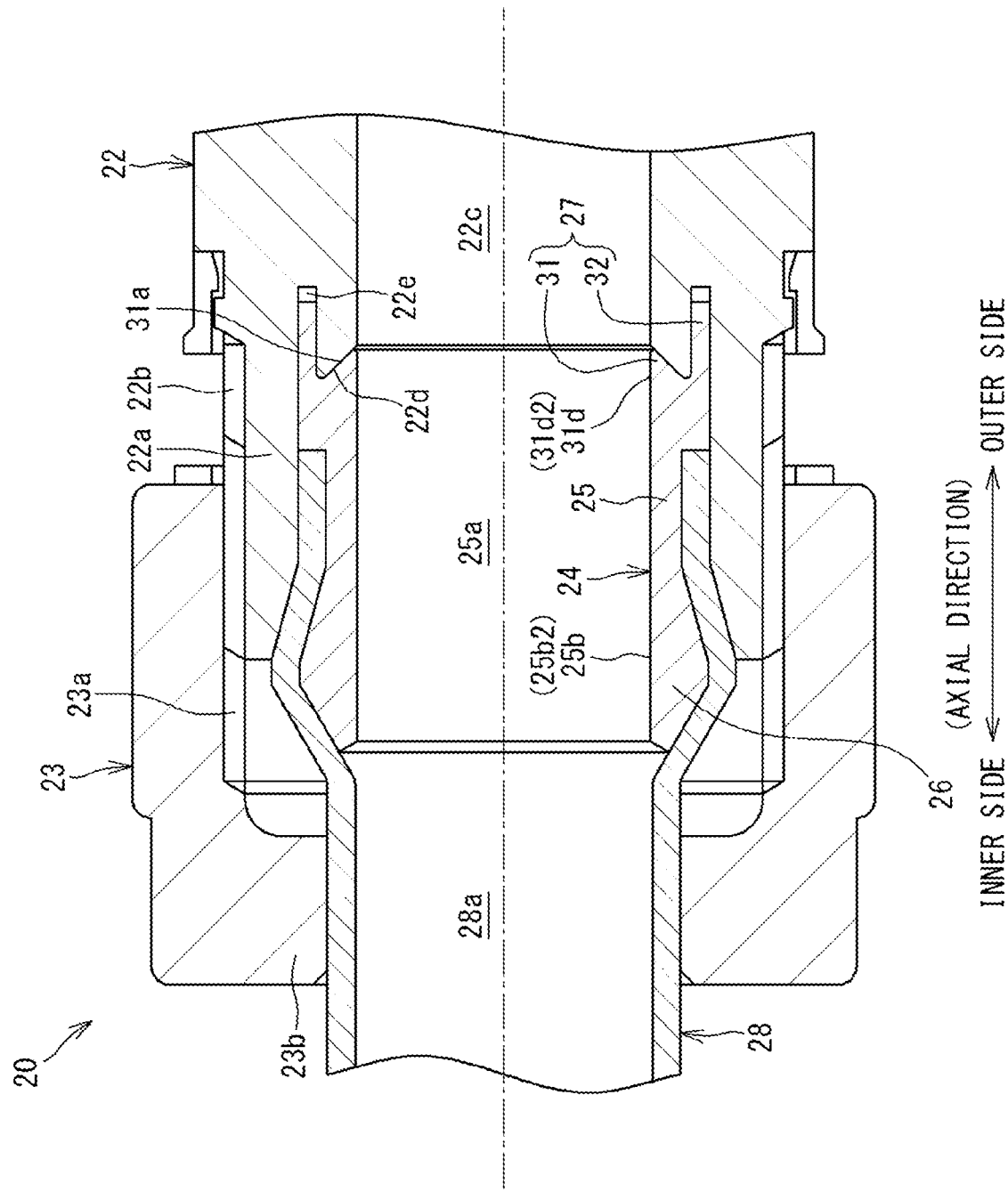
FIG. 4 is an axial cross-sectional view of a flow passage connection structure, in which a sealing member is used, according to a second embodiment of the present invention.

FIG. 4 is an axial cross-sectional view of a flow passage connection structure, in which a sealing member is used, according to a second embodiment of the present invention. In FIG. 4, similar to the first embodiment, a flow passage connection structure 20 of the present embodiment is used, for example, in a pipe path through which a chemical solution (fluid) used in a semiconductor manufacturing apparatus flows. The flow passage connection structure 20 includes a joint body 22, a union nut 23, and an inner ring 24. Hereinafter, in the present embodiment, for convenience, the right side of FIG. 4 is referred to as an axially outer side, and the left side of FIG. 4 is referred to as an axially inner side (the same applies to FIG. 5 and FIG. 6).

The inner ring 24 is formed in a cylindrical shape, for example, from a synthetic resin material such as polyvinyl chloride (PVC), polypropylene (PP), polyethylene (PE), or a fluorine resin (perfluoroalkoxy alkane (PFA), polytetrafluoroethylene (PTFE), polyvinylidene fluoride (PVDF), or the like). The inner ring 24 includes a body portion 25 formed in a cylindrical shape, a bulge portion 26 formed at an axial inner end portion of the body portion 25, and a connection portion 27 formed at an axially outer end portion of the body portion 25.

The bulge portion 26 is formed at the axial inner end portion of the body portion 25 so as to project toward the radially outer side. The bulge portion 26 is press-fitted into an end portion of a tube 28, which is made of a synthetic resin material (PFA or the like), to increase the diameter of the end portion. The connection portion 27 is connected to an end portion of the joint body 22 and seals a connection portion therebetween. The configuration of the connection portion 27 will be described later. A communication hole 25a which provides communication between a flow passage hole 22c formed inside the joint body 22 and a flow passage hole 28a formed inside the tube 28 is formed inside the body portion 25.

The joint body 22 is formed in a cylindrical shape, for example, from a synthetic resin material such as PVC, PP, PE, or a fluorine resin (PFA, PTFE, or the like). The inner diameter of the joint body 22 is set to substantially the same dimension as the inner diameter of the body portion 25 of the inner ring 24 such that the movement of the chemical solution is not hindered. A receiving portion 22a is formed at an end portion of the joint body 22. The inner ring 24 press-fitted into the end portion of the tube 28 is fitted to the inner circumference of the receiving portion 22a. Accordingly, the end portion of the joint body 22 is mounted on the outer circumference of the end portion of the tube 28. An external thread portion 22b is formed on the outer circumference of the receiving portion 22a.

The joint body 22 has an annular primary sealing groove (sealing groove) 22d and an annular secondary sealing groove 22e which are formed on the radially inner side with respect to the receiving portion 22a. The primary sealing groove 22d is formed on the circumferential surface of a connection end portion of the flow passage hole 22c in a tapered shape that is cut such that the diameter thereof gradually increases from the axially outer end thereof toward the axially inner end thereof. The secondary sealing groove 22e is formed in a cylindrical annular shape on the radially outer side with respect to the primary sealing groove 22d in the joint body 22.

The union nut 23 is formed in a cylindrical shape, for example, from a synthetic resin material such as PVC, PP, PE, or a fluorine resin (PFA, PTFE, or the like). The union nut 23 has an internal thread portion 23a formed on the inner circumference of an axially outer end portion thereof, and a pressing portion 23b formed at an axial inner end portion thereof so as to project toward the radially inner side. The internal thread portion 23a is tightened to the external thread portion 22b of the joint body 22. By the tightening, the union nut 23 is attached to the joint body 22, and an axial inner end portion of the pressing portion 23b also presses the outer circumferential surface of the tube 28 by the bulge portion 26 of the inner ring 24.

With the above configuration, by tightening the internal thread portion 23a of the union nut 23 to the external thread portion 22b of the joint body 22, sealing performance at the attachment point between the receiving portion 22a of the joint body 22 and the end portion of the tube 28 can be ensured, and the tube 28 can be prevented from being removed.

The connection portion 27 of the inner ring 24 includes an annular primary sealing portion (sealing portion) 31 and an annular secondary sealing portion 32.

The primary sealing portion 31 is formed so as to project from the radially inner side of the axially outer end portion of the body portion 25 toward the axially outer side. In addition, the primary sealing portion 31 is formed so as to be tapered from the axially inner end thereof toward the axially outer end thereof in an axial cross-sectional view. An outer circumferential surface 31a of the primary sealing portion 31 is formed, so as to match the shape of the primary sealing groove 22d, as a tapered surface formed such that the diameter thereof gradually increases from the axially outer end thereof toward the axially inner end thereof. Accordingly, the primary sealing portion 31 is press-fitted into the primary sealing groove 22d of the joint body 22.

The secondary sealing portion 32 is formed so as to project from the radially outer side of the axially outer end portion of the body portion 25 toward the axially outer side. The secondary sealing portion 32 is formed in a cylindrical annular shape and press-fitted into the secondary sealing groove 22e of the joint body 22.

With the above configuration, when the union nut 23 is tightened, the primary sealing portion 31 and the secondary sealing portion 32 of the inner ring 24 are press-fitted into the primary sealing groove 22d and the secondary sealing groove 22e of the joint body 22, respectively. Accordingly, sealing performance at the connection portion between the inner ring 24 and the joint body 22 can be ensured. Therefore, the inner ring 24 functions as a sealing member that seals and connects the flow passage hole 28a of the tube (fluid device) 28 and the flow passage hole 22c of the joint body (fluid device) 22.

Meanwhile, when the primary sealing portion 31 and the secondary sealing portion 32 of the inner ring 24 are press-fitted into the primary sealing groove 22d and the secondary sealing groove 22e of the joint body 22 by tightening the union nut 23, the axially outer end of the primary sealing portion 31 may slip along the slope of the primary sealing groove 22d toward the axially outer side. When such a slip occurs, an inner circumferential surface 25b of the body portion 25 becomes bent and deformed toward the radially outer side such that the inner circumferential side of the body portion 25 is bent. In the present embodiment, the inner circumferential surface 25b of the body portion 25 is formed in a shape that inhibits the inner circumferential surface 25b from becoming bent and deformed so as to be recessed toward the radially outer side in a press-fitted state which is a state where the primary sealing portion 31 and the secondary sealing portion 32 are press-fitted into the primary sealing groove 22d and the secondary sealing groove 22e. Hereinafter, the detailed shape thereof will be described.

<Configuration of Inner Circumferential Side of Inner Ring>

Figure 5:
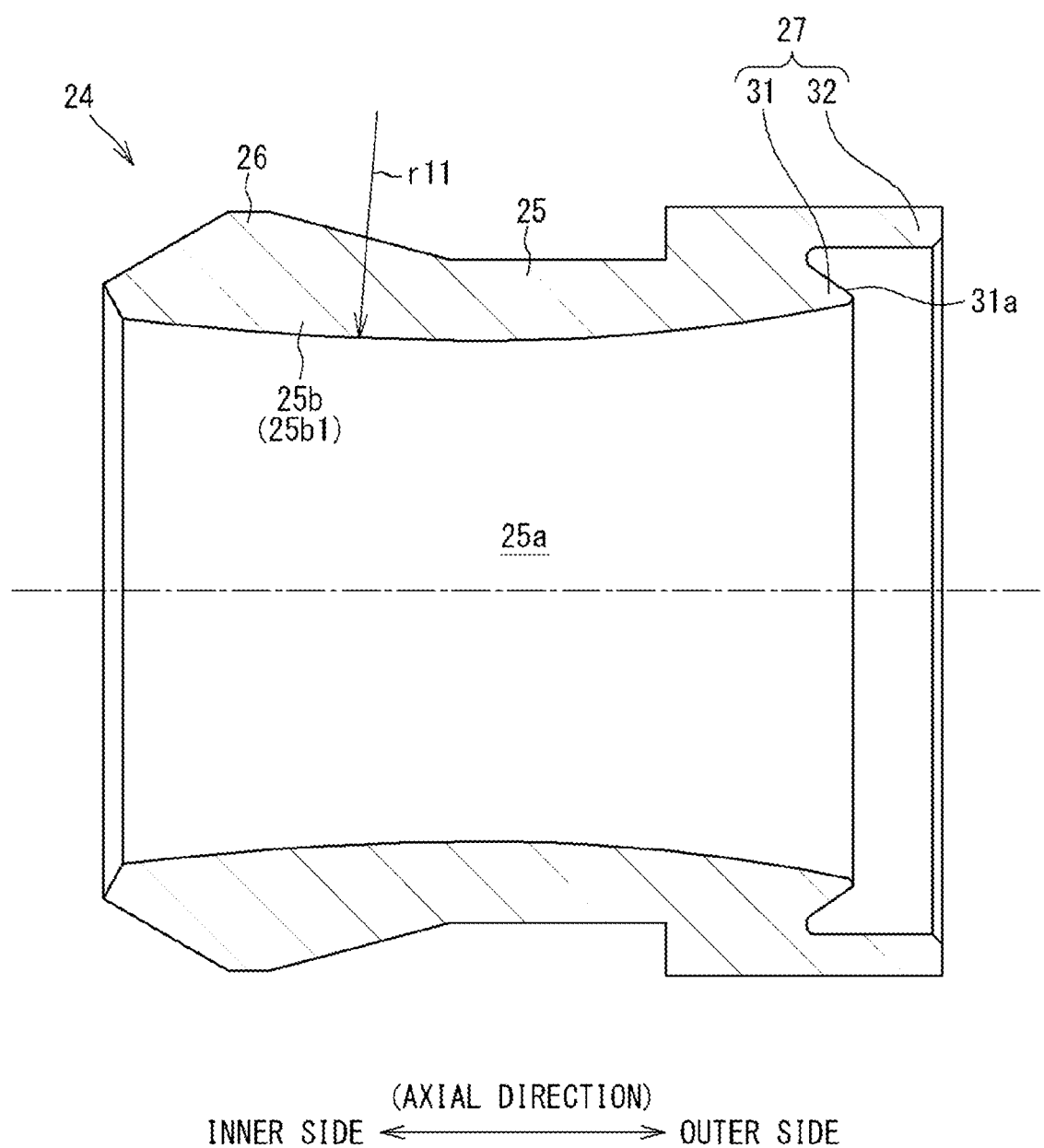
FIG. 5 is an axial cross-sectional view of an inner ring.

FIG. 5 is an axial cross-sectional view of the inner ring 24 and shows a pre-press-fit state which is a state before the primary sealing portion 31 and the secondary sealing portion 32 are press-fitted into the primary sealing groove 22d and the secondary sealing groove 22e (see FIG. 4). In FIG. 5, the entirety of the inner circumferential surface 25b of the body portion 25 in the inner ring 24 is formed such that the diameter thereof gradually decreases from both axially outer ends thereof toward the axially inner side.

In the present embodiment, the entirety of the inner circumferential surface 25b of the body portion 25 is formed by a curved line 25b1 projecting most radially inward at a center in the axial direction thereof in an axial cross-sectional view. The curved line 25b1 of the inner circumferential surface 25b is formed such that, in the press-fitted state shown in FIG. 4, the curved line 25b1 becomes bent and deformed toward the radially outer side to be a straight line 25b2 extending in the axial direction. That is, a radius of curvature r11 of the curved line 25b1 is set such that the shape after the curved line 25b1 becomes bent and deformed toward the radially outer side becomes the straight line 25b2.

Figure 6:
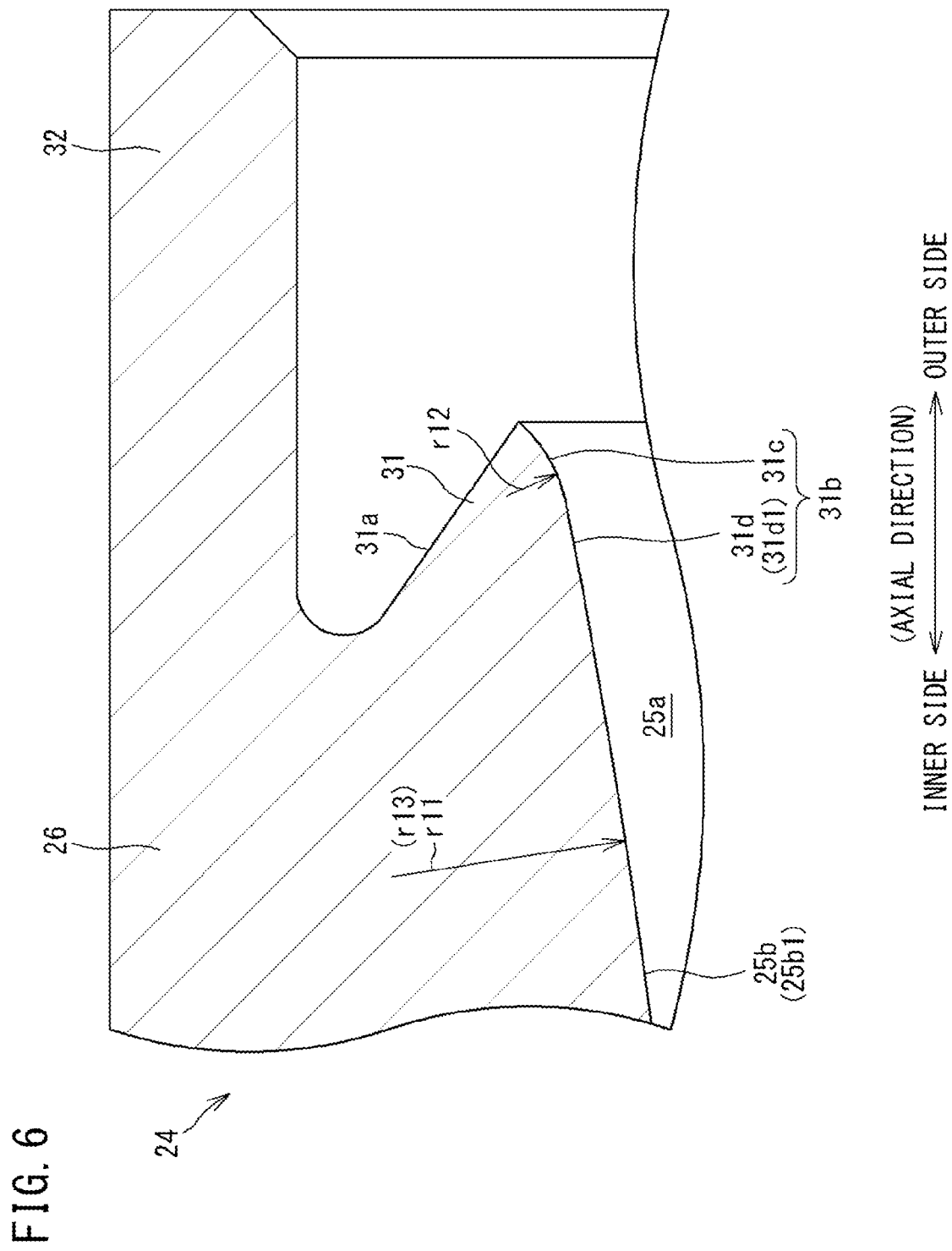
FIG. 6 is an enlarged cross-sectional view of a main part of FIG. 5.
Figure 7:
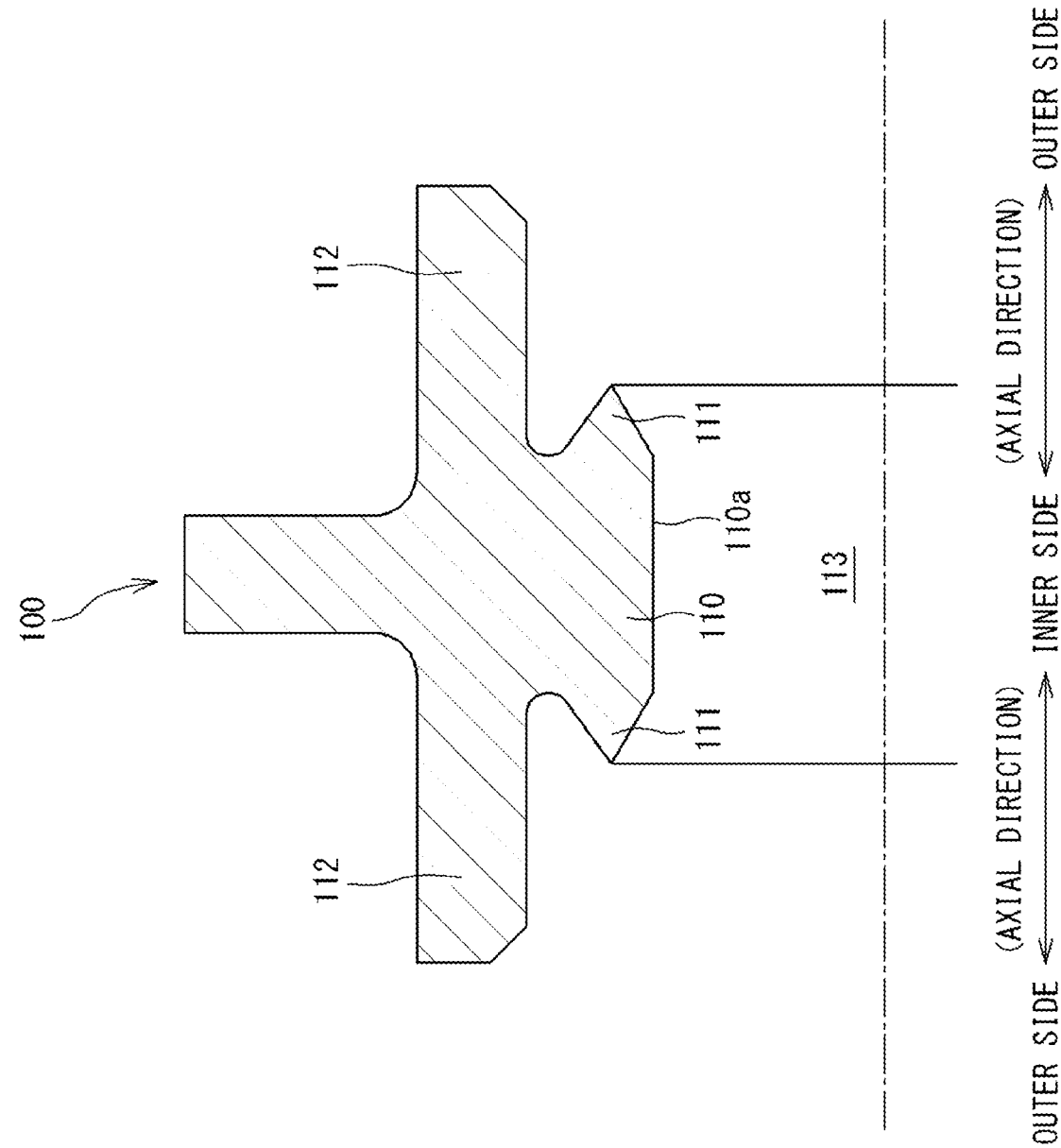
FIG. 7 is an axial cross-sectional view of a conventional gasket.
Figure 8:
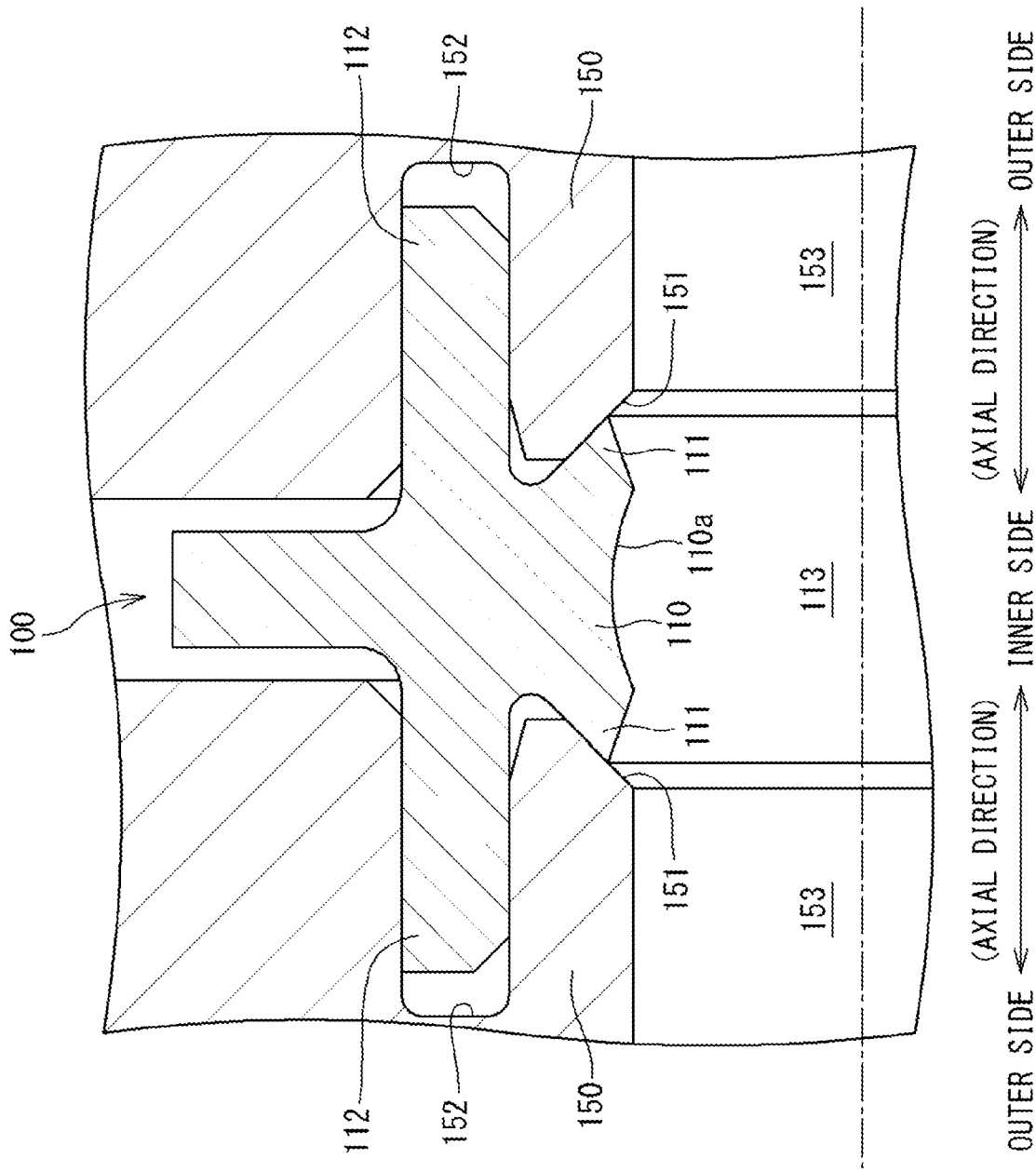
FIG. 8 is an axial cross-sectional view showing a state where flow passage holes of two fluid devices are connected by the conventional gasket.

FIG. 6 is an enlarged cross-sectional view of a main part of FIG. 5. In FIG. 6, the entirety of an inner circumferential surface 31b of the primary sealing portion 31 of the inner ring 24 is formed such that the diameter thereof gradually decreases from the axially outer end thereof toward the axially inner end thereof. In the present embodiment, the entirety of the inner circumferential surface 31b of the primary sealing portion 31 is formed by a curved line projecting most radially inward at the axially outer end thereof in an axial cross-sectional view.

The degree of diameter decrease of an axially outer end portion 31c of the inner circumferential surface 31b of the primary sealing portion 31 is larger than the degree of diameter decrease of the inner circumferential surface 25b of the body portion 25. That is, a radius of curvature r12 of the axially outer end portion 31c of the inner circumferential surface 31b of the primary sealing portion 31 is smaller than the radius of curvature r11 of the inner circumferential surface 25b of the body portion 25.

The entirety of another portion 31d, excluding the axially outer end portion 31c, of the inner circumferential surface 31b of the primary sealing portion 31 is formed such that the diameter thereof gradually decreases from the axially outer end thereof toward the axially inner end thereof. In the present embodiment, the entirety of the other portion 31d is formed by a curved line 31d1 projecting most radially inward at the axially inner end thereof in an axial cross-sectional view. A radius of curvature r13 of the curved line 31d1 is equal to the radius of curvature r11 of the inner circumferential surface 25b of the body portion 25. Therefore, the curved line 31d1 is formed such that, in the press-fitted state shown in FIG. 4, the curved line 31d1 becomes bent and deformed toward the radially outer side to be a straight line 31d2 extending in the axial direction. That is, the radius of curvature r13 of the curved line 31d1 is set such that the shape after the curved line 31d1 becomes bent and deformed toward the radially outer side becomes the straight line 31d2.

Advantageous Effects of Second Embodiment

In the inner ring 24 of the present embodiment, in the pre-press-fit state, the entirety of the inner circumferential surface 25b of the body portion 25 is formed such that the diameter thereof gradually decreases from both axially outer ends thereof toward the axially inner side. That is, in the pre-press-fit state, the entirety of the inner circumferential surface 25b of the body portion 25 is formed so as to project toward the radially inner side. Accordingly, when the primary sealing portion 31 is press-fitted into the primary sealing groove 22d, even if the axially outer end of the primary sealing portion 31 slips along the slope of the primary sealing groove 22d toward the axially outer side, the inner circumferential surface 25b of the body portion 25 can be inhibited from becoming bent and deformed so as to be recessed toward the radially outer side. As a result, the contact surface pressure between the axially outer end of the primary sealing portion 31 and the primary sealing groove 22d can be inhibited from decreasing, so that a fluid can be inhibited from entering between the primary sealing portion 31 and the primary sealing groove 22d and leaking to the outside.

Moreover, in the pre-press-fit state, the entirety of the inner circumferential surface 31b of the primary sealing portion 31 is formed such that the diameter thereof gradually decreases from the axially outer end thereof toward the axially inner end thereof. That is, in the pre-press-fit state, the entirety of the inner circumferential surface 31b of the primary sealing portion 31 is formed so as to project toward the radially inner side. Accordingly, when the primary sealing portion 31 is press-fitted into the primary sealing groove 22d, the inner circumferential surface 31b of the primary sealing portion 31 can be further inhibited from becoming bent and deformed so as to be recessed toward the radially outer side together with the body portion 25. As a result, the contact surface pressure between the axially outer end of the primary sealing portion 31 and the primary sealing groove 22d can be further inhibited from decreasing.

Moreover, in the pre-press-fit state, the axially outer end portion 31c of the inner circumferential surface 31b of the primary sealing portion 31 is formed such that the diameter thereof gradually decreases from the axially outer end thereof toward the axially inner end thereof. That is, in the pre-press-fit state, the axially outer end portion 31c of the inner circumferential surface 31b of the primary sealing portion 31 is located on the radially outer side with respect to the other portion 31d of the inner circumferential surface 31b. Accordingly, when the primary sealing portion 31 is press-fitted into the primary sealing groove 22d, even if the axially outer end of the primary sealing portion 31 slips relative to the primary sealing groove 22d, the axially outer end portion 31c of the inner circumferential surface 31b of the primary sealing portion 31 can be inhibited from excessively projecting toward the radially inner side. Accordingly, the flow of the fluid in the communication hole 25a of the body portion 25 can be inhibited from being obstructed by the inner circumferential surface 31b of the primary sealing portion 31.

Moreover, since the degree of diameter decrease of the axially outer end portion 31c of the inner circumferential surface 31b of the primary sealing portion 31 is larger than the degree of diameter decrease of the inner circumferential surface 25b of the body portion 25, the radial thickness on the axially outer side of the primary sealing portion 31 can be larger than in the case where the degree of diameter decrease of the primary sealing portion 31 is the same as the degree of diameter decrease of the body portion 25. Accordingly, the contact surface pressure between the axially outer end of the primary sealing portion 31 and the primary sealing groove 22d can be further inhibited from decreasing.

Moreover, in the pre-press-fit state, the entirety of the inner circumferential surface 25b of the body portion 25 is formed by the curved line 25b1 projecting toward the radially inner side. Accordingly, when the primary sealing portion 31 is press-fitted into the primary sealing groove 22d, the inner circumferential surface 25b of the body portion 25 can be further inhibited from becoming bent and deformed so as to be recessed toward the radially outer side.

Moreover, the curved line 25b1 of the inner circumferential surface 25b of the body portion 25 and the curved line 31d1 of the other portion 31d of the inner circumferential surface 31b of the primary sealing portion 31 are formed such that, in the press-fitted state, the curved line 25b1 and the curved line 31d1 become bent and deformed toward the radially outer side to be the straight lines 25b2 and 31d2. Accordingly, the inner circumferential surface 25b of the body portion 25 can be further inhibited from becoming bent and deformed so as to be recessed toward the radially outer side in the press-fitted state. As a result, the contact surface pressure between the axially outer end of the primary sealing portion 31 and the primary sealing groove 22d can be further inhibited from decreasing.

[Others]

The sealing member (the gasket 4, the inner ring 24) of the present invention can be applied to the liquid crystal/organic EL field, the medical/pharmaceutical field, automotive-related fields, etc., in addition to a semiconductor manufacturing apparatus. In addition, the present invention can also be applied to a sealing member merely having a primary sealing portion.

It is sufficient that the curved line 10b1 or 25b1 of the inner circumferential surface 10b or 25b of the body portion 10 or 25 of the sealing member is formed so as not to become bent and deformed toward the radially outer side beyond the straight line 10b2 or 25b2 in the press-fitted state. For example, the curved line 10b1 or 25b1 of the inner circumferential surface 10b or 25b may be formed so as to be a curved line projecting toward the radially inner side in the press-fitted state.

In the pre-press-fit state, the curved line 10b1 or 25b1 of the inner circumferential surface 10b or 25b of the body portion 10 or 25 is formed so as to project most radially inward at the center in the axial direction thereof, but may be formed so as to project most radially inward at an arbitrary position other than both axially outer ends thereof.

It is sufficient that in the pre-press-fit state, at least a part of the inner circumferential surface 10b or 25b of the body portion 10 or 25 and/or a part of the other portion 11d or 31d of the inner circumferential surface 11b or 31b of the primary sealing portion 11 or 31 is formed such that the diameter thereof gradually decreases from the axially outer side toward the axially inner side. For example, only a part of the inner circumferential surface 10b or 25b of the body portion 10 or 25 may be formed such that the diameter thereof gradually decreases from the axially outer side toward the axially inner side. In addition, only a part or the entirety of the other portion 11d or 31d of the inner circumferential surface 11b or 31b of the primary sealing portion 11 or 31 may be formed such that the diameter thereof gradually decreases from the axially outer side toward the axially inner side.

In the pre-press-fit state, the entirety of the axially outer end portion 11c or 31c of the inner circumferential surface 11b or 31b of the primary sealing portion 11 or 31 may be formed by a straight line extending in the axial direction in an axial cross-sectional view. In addition, in the pre-press-fit state, the inner circumferential surface 11b or 31b of the primary sealing portion 11 or 31 may be formed by a straight line extending in the axial direction over the entirety in the axial direction in an axial cross-sectional view.

In the pre-press-fit state, as long as the inner circumferential surface 10b or 25b of the body portion 10 or 25 is formed such that the diameter thereof gradually decreases from the axially outer side toward the axially inner side, the inner circumferential surface 10b or 25b may be formed in a shape (for example, by a tapered line) other than a curved line. Similarly, as long as the inner circumferential surface 11b or 31b of the primary sealing portion 11 or 31 is formed such that the diameter thereof gradually decreases from the axially outer side toward the axially inner side, the inner circumferential surface 11b or 31b may be formed in a shape (for example, by a tapered line) other than a curved line.

The embodiments disclosed herein are merely illustrative in all aspects and should not be recognized as being restrictive. The scope of the present invention is defined by the scope of the claims rather than the meaning described above, and is intended to include meaning equivalent to the scope of the claims and all modifications within the scope.

REFERENCE SIGNS LIST 2 fluid device
2c flow passage hole
2d primary sealing groove (sealing groove)
4 gasket (sealing member)
10 body portion
10a communication hole
10b inner circumferential surface
10b1 curved line
10b2 straight line
11 primary sealing portion (sealing portion)
11b inner circumferential surface
11c axially outer end portion
11d other portion
22 joint body (fluid device)
22c flow passage hole
22d primary sealing groove (sealing groove)
24 inner ring (sealing member)
25 body portion
25a communication hole
25b inner circumferential surface
25b1 curved line
25b2 straight line
28 tube (fluid device)
28a flow passage hole
31 primary sealing portion (sealing portion)
31b inner circumferential surface
31c axially outer end portion
31d other portion

The invention claimed is:

1. A sealing member for sealing and connecting flow passage holes formed in two fluid devices, respectively, the sealing member comprising:
    a cylindrical body portion having a communication hole for providing communication between the flow passage holes; and
    an annular sealing portion projecting from a radially inner side of an axially outer end portion of the body portion toward an axially outer side and to be press-fitted into an annular sealing groove formed at a connection end portion of the flow passage hole of one of the fluid devices, wherein
    in a pre-press-fit state which is a state before the sealing portion is press-fitted into the sealing groove, an entirety of an inner circumferential surface of the body portion is formed by a curved line projecting most radially inward at a center in an axial direction thereof in an axial cross-sectional view such that a diameter thereof gradually decreases from both axially outer ends thereof toward an axially inner side, and
    a radius of curvature of the curved line is set such that the curved line becomes bent and deformed toward a radially outer side to be a straight line extending in the axial direction in an axial cross-sectional view in a state where the sealing portion is press-fitted into the sealing groove.

2. The sealing member according to claim 1, wherein, in the pre-press-fit state, the axially outer end portion of the inner circumferential surface of the sealing portion is formed such that the diameter thereof gradually decreases from an axially outer end thereof toward an axially inner end thereof.

3. The sealing member according to claim 2, wherein a degree of diameter decrease of the axially outer end portion of the inner circumferential surface of the sealing portion is larger than a degree of diameter decrease of the inner circumferential surface of the body portion.

4. The sealing member according to claim 1, wherein, in the pre-press-fit state, an entirety of the inner circumferential surface of the sealing portion is formed such that the diameter thereof gradually decreases from an axially outer end thereof toward an axially inner end thereof.

* * * * *